US008847946B2

(12) United States Patent
Kang et al.

(10) Patent No.: US 8,847,946 B2
(45) Date of Patent: Sep. 30, 2014

(54) LIQUID CRYSTAL DISPLAY AND METHOD OF DRIVING THE SAME

(75) Inventors: Sin Ho Kang, Suwon-si (KR); Hong Sung Song, Kumi-si (KR); Jin Cheol Hong, Kumi-si (KR); Seung Kuk An, Kumi-si (KR)

(73) Assignee: LG Display Co., Ltd., Seoul (KR)

(*) Notice: Subject to any disclaimer, the term of this patent is extended or adjusted under 35 U.S.C. 154(b) by 598 days.

(21) Appl. No.: 12/461,381

(22) Filed: Aug. 10, 2009

(65) Prior Publication Data

US 2009/0303225 A1 Dec. 10, 2009

Related U.S. Application Data

(62) Division of application No. 10/963,596, filed on Oct. 14, 2004, now Pat. No. 7,586,474.

(30) Foreign Application Priority Data

Dec. 11, 2003 (KR) ........................ 10-2003-0090301
Apr. 28, 2004 (KR) ........................ 10-2004-0029610

(51) Int. Cl.

| | |
|---|---|
| ***G06F 3/038*** | (2013.01) |
| ***G09G 5/00*** | (2006.01) |
| ***G09G 3/36*** | (2006.01) |
| ***H04N 5/00*** | (2011.01) |
| ***G09G 3/20*** | (2006.01) |

(52) U.S. Cl.

CPC ...... *G09G 3/3688* (2013.01); *G09G 2300/0426* (2013.01); *G09G 3/20* (2013.01); *G09G 2310/027* (2013.01)

USPC .............................. 345/213; 345/87; 348/615

(58) Field of Classification Search

USPC .......................................................... 345/213

See application file for complete search history.

(56) References Cited

U.S. PATENT DOCUMENTS

| | | | | |
|---|---|---|---|---|
| 3,981,002 | A * | 9/1976 | Gardner | 345/2.1 |
| 5,440,304 | A * | 8/1995 | Hirai | 341/100 |
| 5,694,213 | A * | 12/1997 | Gable | 345/699 |
| 6,049,321 | A | 4/2000 | Sasaki | |
| 6,278,509 | B1 | 8/2001 | Ohga et al. | 349/150 |
| 2001/0017607 | A1 | 8/2001 | Kwon et al. | |
| 2002/0130974 | A1* | 9/2002 | Kimura et al. | 348/615 |
| 2002/0186230 | A1 | 12/2002 | Kudo et al. | |

(Continued)

FOREIGN PATENT DOCUMENTS

| | | |
|---|---|---|
| CN | 1180418 | 4/1998 |
| CN | 1405745 | 3/2003 |

(Continued)

*Primary Examiner* — Charles V Hicks

(74) *Attorney, Agent, or Firm* — McKenna Long & Aldridge LLP

(57) ABSTRACT

A liquid crystal display (LCD) device and a driving method thereof for improving a working efficiency of the LCD and reducing manufacturing costs. The liquid crystal display device includes a liquid crystal display panel having liquid crystal cells at crossings of data lines and gate lines, data integrated circuit supplying pixel data via a plurality of data output channels, a gate integrated circuit driving the gate lines, a channel selector for selecting the plurality of data output channels of the data integrated circuits in accordance with a number of the data lines wherein only the selected data output channels contain the pixel data, and a timing controller for controlling the data integrated circuit and the gate integrated circuit.

20 Claims, 17 Drawing Sheets

(56) References Cited

U.S. PATENT DOCUMENTS

| | | | | |
|---|---|---|---|---|
| 2003/0030607 | A1 | 2/2003 | Kitagawa et al. | 345/87 |
| 2003/0117362 | A1 | 6/2003 | An | 345/98 |
| 2003/0132907 | A1 | 7/2003 | Lee et al. | 345/98 |
| 2003/0174115 | A1 | 9/2003 | Washio et al. | 345/98 |
| 2004/0080478 | A1 | 4/2004 | Akimoto | 345/87 |
| 2004/0080500 | A1 | 4/2004 | Koyama | 345/204 |
| 2004/0090412 | A1 | 5/2004 | Jeon et al. | 345/100 |
| 2005/0024353 | A1* | 2/2005 | Amundson et al. | 345/204 |

FOREIGN PATENT DOCUMENTS

| | | | |
|---|---|---|---|
| CN | 1409164 | | 4/2003 |
| CN | 1412736 | | 4/2003 |
| DE | 19540146 | A1 | 5/1996 |
| DE | 19716095 | A1 | 11/1997 |
| DE | 10226070 | A1 | 8/2003 |
| GB | 2384102 | A | 7/2003 |
| JP | 61-292127 | | 12/1986 |
| JP | 64-084298 | | 3/1989 |
| JP | 4170515 | | 6/1992 |
| JP | 643424 | | 2/1994 |
| JP | 07295522 | | 10/1995 |
| JP | 10149139 | | 2/1998 |
| JP | 10214061 | | 8/1998 |
| JP | 11-194737 | | 7/1999 |
| JP | 2003-208135 | | 7/2003 |

* cited by examiner

LIQUID CRYSTAL DISPLAY AND METHOD OF DRIVING THE SAME

CROSS-REFERENCE TO RELATED APPLICATIONS

This application is a Divisional of application Ser. No. 10/963,596 filed Oct. 14, 2004 now U.S. Pat. No. 7,586,474, now allowed; which claims priority to Korean Patent Application Nos. 10-2003-90301, and 10-2004-29610 filed Dec. 11, 2003 and Apr. 28, 2004 respectively all of which are hereby incorporated by reference for all purposes as if fully set forth herein.

BACKGROUND OF THE INVENTION

1. Field of the Invention

The present invention relates to a liquid crystal display. More particularly, the invention relates to a liquid crystal display and a driving method thereof that improve the efficiency of a liquid crystal display device as well as reduce manufacturing costs.

2. Discussion of the Related Art

A liquid crystal display (LCD) controls a light transmittance of a liquid crystal using an electric field to display a picture.

As shown in FIG. 1, the LCD includes a liquid crystal display panel 2 having liquid crystal cells arranged in a matrix, a gate driver 6 for driving gate lines GL1 to GLn of the liquid crystal display panel 2, a data driver 4 for driving data lines DL1 to DLm of the liquid crystal display panel 2, and a timing controller 8 for controlling the gate driver 6 and the data driver 4.

The liquid crystal display panel 2 also includes a thin film transistor TFT located at each crossing between the gate lines GL1 to GLn and the data lines DL1 to DLm, and a liquid crystal cell 7 connected to the thin film transistor TFT. The thin film transistor TFT is turned on when it is supplied with a scanning signal, that is, a gate high voltage VGH from the gate line GL, to apply a pixel signal from the data line DL to the liquid crystal cell 7. Further, the thin film transistor TFT is turned off when it is supplied with a gate low voltage VGL from the gate line GL, to thereby keep a pixel signal charged in the liquid crystal cell 7.

The liquid crystal cell 7 may be equivalently represented as a liquid crystal capacitor. The liquid crystal cell 7 includes a pixel electrode connected with a common electrode and a thin film transistor with a liquid crystal therebetween. Further, the liquid crystal cell 7 includes a storage capacitor to maintain the charged pixel signal until the next pixel signal is applied. This storage capacitor is provided between the pixel electrode and the pre-stage gate line. Such a liquid crystal cell 7 varies an alignment state of the liquid crystal having a dielectric anisotropy in accordance with a pixel signal charged through the thin film transistor TFT to control a light transmittance, thereby implementing gray scale levels.

The timing controller 8 generates gate control signals (i.e., gate start pulse (GSP), gate shift clock (GSC) and gate output enable (GOE)) and data control signals (i.e., source start pulse (SSP), source shift clock (SSC), source output enable (SOE) and polarity control (POL)) using synchronizing signals V and H supplied from a video card (not shown). The gate control signals (i.e., GSP, GSC and GOE) are applied to the gate driver 6 to control the gate driver 6 while the data control signals (i.e., SSP, SSC, SOE and POL) are applied to the data driver 4 to control the data driver 4. Further, the timing controller 8 aligns red (R), green (G) and blue (B) pixel data VD and applies the pixel data to the data driver 4.

The gate driver 6 sequentially drives the gate lines GL1 to GLn. To this end, the gate driver 6 includes a plurality of gate integrated circuits (ICs) 10 as shown in FIG. 2A. The gate ICs 10 sequentially drive the gate lines GL1 to GLn connected thereto under the control of the timing controller 8. Specifically, the gate ICs 10 sequentially apply a gate high voltage VGH to the gate lines GL1 to GLn in response to the gate control signals (i.e., GSP, GSC and GOE) from the timing controller 8.

More specifically, the gate driver 6 shifts a gate start pulse GSP in response to a gate shift clock GSC to generate a shift pulse. Then, the gate driver 6 applies a gate high voltage VGH to the corresponding gate line GL every horizontal period in response to the shift pulse. The shift pulse is shifted line-by-line every horizontal period, and any one of the gate ICs 10 applies the gate high voltage VGH to the corresponding gate line GL to correspond with the shift pulse. The gate ICs supplies a gate low voltage VGL in the remaining interval for the particular gate line when the gate high voltage VGH is not supplied to the gate lines GL1 to GLn.

The data driver 4 applies pixel signals for each one line to the data lines DL1 to DLm every horizontal period. To this end, the data driver 4 includes a plurality of data ICs 16 as shown in FIG. 2B. The data ICs 16 apply pixel signals to the data lines DL1 to DLm in response to data control signals (i.e., SSP, SSC, SOE and POL) from the timing controller 8. The data ICs 16 convert pixel data VD from the timing controller 8 to analog pixel signals using a gamma voltage from a gamma voltage generator (not shown).

The data ICs 16 shift a source start pulse SSP in response to a source shift clock SSC to generate sampling signals. Then, the data ICs 16 sequentially latch the pixel data VD for a certain unit in response to the sampling signals. Thereafter, the data ICs 16 convert the latched pixel data VD for one line to analog pixel signals, and applies the signals to the data lines DL1 to DLm in an enable interval of a source output enable signal SOE. The data ICs 16 convert the pixel data VD to positive or negative pixel signals in response to a polarity control signal POL.

As shown in FIG. 3, each of the data ICs 16 includes a shift register part 34 for applying sequential sampling signals, a latch part 36 for sequentially latching the pixel data VD in response to the sampling signals from the shift register part 34 to output them simultaneously, a digital to analog converter (DAC) 38 for converting the pixel data VD from the latch part 36 to pixel voltage signals, and an output buffer part 46 for buffering pixel voltage signals from the DAC 38 to output them. Further, the data IC 16 includes a signal controller 20 for interfacing various control signals (i.e., SSP, SSC, SOE, REV and POL, etc.) from the timing controller 8 and the pixel data VD, and a gamma voltage part 32 for supplying positive and negative gamma voltages required for the DAC 38.

The signal controller 20 controls various control signals (i.e., SSP, SSC, SOE, REV and POL, etc.) from the timing controller 8 and the pixel data VD in such a manner to be output to the corresponding elements.

The gamma voltage part 32 sub-divides a plurality of gamma reference voltages input from a gamma reference voltage generator (not shown) for each gray level to output them.

Shift registers included in the shift register part 34 sequentially shift a source start pulse SSP from the signal controller 20 in response to a source sampling clock signal SSC to output it as a sampling signal.

The latch part 36 sequentially samples the pixel data VD from the signal controller 20 for a time period in response to the sampling signals from the shift register part 34 to latch them. The latch part 36 is comprised of i latches (wherein i is an integer) so as to latch i pixel data VD, and each of the latches has a dimension corresponding to the bit number of the pixel data VD. Particularly, the timing controller 8 divides the pixel data VD into even pixel data $VD_{even}$ and odd pixel data $VD_{odd}$ so as to reduce a transmission frequency, and simultaneously outputs the data through each transmission line. Herein, each of the even pixel data $VD_{even}$ and the odd pixel data $VD_{odd}$ includes red (R), green (G) and blue (B) pixel data. Thus, the latch part 36 simultaneously latches the even pixel data $VD_{even}$ and the odd pixel data $VD_{odd}$ supplied via the signal controller 20 for each sampling signal. Then, the latch part 36 simultaneously outputs i latched pixel data VD in response to a source output enable signal SOE from the signal controller 20.

The latch part 36 restores pixel data VD modulated such that the transition bit number is reduced in response to a data inversion selection signal REV to output them. The timing controller 8 modulates the pixel data VD, such that the number of transition bits are minimized using a reference value to determine whether the bits should be inserted or not. This minimizes an electromagnetic interference (EMI) upon data transmission due to a minimal number of bit transitions from LOW to HIGH or HIGH to LOW.

The DAC 38 simultaneously converts the pixel data VD from the latch part 36 into positive and negative pixel voltage signals to output them. To this end, the DAC 38 includes a positive (P) decoding part 40 and a negative (N) decoding part 42 commonly connected to the latch part 36, and a multiplexer (MUX) part 44 for selecting output signals of the P decoding part 40 and the N decoding part 42.

The n P decoders included in the P decoding part 40 convert n pixel data input simultaneously from the latch part 36 into positive pixel voltage signals using positive gamma voltages from the gamma voltage part 32. The i N decoders included in the N decoding part 42 convert i pixel data input simultaneously from the latch part 36 into negative pixel voltage signals using negative gamma voltages from the gamma voltage part 32. The i multiplexers included in the multiplexer part 44 selectively output the positive pixel voltage signals from the P decoder 40 or the negative pixel voltage signals from the N decoder 42 in response to a polarity control signal POL from the signal controller 20.

The i output buffers included in the output buffer part 46 are comprised of voltage followers, etc. connected, in series, to the respective i data lines DL1 to DLi. Such output buffers buffer pixel voltage signals from the DAC 38 to apply them to the data lines DL1 to DLi.

Such a related art LCD differentiates output channels of the data ICs 16 included in the data driver 4 based upon a resolution type of the liquid crystal display panel 2. This is because the data ICs 16 have certain channels that are connected to the data lines DL for each resolution type of the liquid crystal display panel 2. Thus, problems arise in that a different number of data ICs 16 having different output channels for each resolution type of the liquid crystal display panel 2 need to be used. This reduces working efficiency and increases manufacturing cost.

More specifically, for a liquid crystal display having a resolution of an eXtended Graphics Array (XGA) class (i.e., 1024×3) with 3072 data lines DL, it requires four data ICs 16, each of which has 768 data output channels. For a liquid crystal display having a resolution of a Super eXtended Graphics Adapter+ (SXGA+) class (i.e., 1400×3) with 4200 data lines DL, it requires six data ICs 16, each of which has 702 data output channels. In this case, the remaining 12 data output channels are treated as dummy lines. For a liquid crystal display having a resolution of a Wide eXtended Graphics Array (WXGA) class (i.e., 1280×3) with 3840 data lines DL, it requires six data ICs 16, each of which has 642 data output channels. In this case, the remaining 12 data output channels are treated as dummy lines. As mentioned above, a different data ICs 16 having a specific number of output channels have to be used for each resolution type of the liquid crystal display panel 2. As a result, the related art liquid crystal display has a drawback in that a working efficiency is reduced and manufacturing cost is increased.

SUMMARY OF THE INVENTION

Accordingly, the present invention is directed to a liquid crystal display and a method of driving the same that substantially obviates one or more of the problems due to limitations and disadvantages of the related art.

An advantage of the present invention is to provide a display device and a method of driving the same that are adaptive for improving efficiency of displays as well as reducing manufacturing costs.

Another advantage of the present invention is to provide a display device and a driving method thereof that are capable of controlling output channels of data integrated circuits based upon a resolution type of the display panel.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages of the invention, a data driving integrated circuit connected to a plurality of data lines of a display according to one embodiment of the present invention includes, a plurality of output channels, and a selection unit for selecting N data output channels (where N is an integer) from the plurality of output channels, the N data output channels supplying pixel data only to a corresponding number of the plurality of data lines in accordance with a desired resolution of the display.

In another embodiment, a data driving integrated circuit supplying pixel data to a plurality of data lines of a display includes N output channels, wherein N is an integer not less than the plurality of data lines, wherein the N output channels include a number of data output channels and a number of dummy output channels; and a selection part for selecting the data output channels to apply the pixel data in accordance with a desired resolution of the display, wherein the pixel data is not applied to the number of dummy output channels.

In another embodiment, a liquid crystal display device includes a liquid crystal display panel having liquid crystal cells formed at crossings of data lines and gate lines; a data integrated circuit supplying pixel data via a plurality of data output channels; a gate integrated circuit for driving the gate lines; a channel selector for selecting the plurality of data output channels of the data integrated circuit in accordance with a number of data lines; and a timing controller for controlling the data integrated circuit and the gate integrated circuit.

In another embodiment of the present invention, a method of driving a data driving integrated circuit includes, determining a desired resolution of a display, and selecting M data output channels from N plurality of output channels (where M is less than N) connected to a plurality of data lines corresponding to the desired resolution of the display, wherein (N−M) output channels are not supplied with pixel data.

In another embodiment of the present invention, a method of driving a liquid crystal display device includes determining a desired resolution; selecting a data output channel set from a plurality of output channels connected to data lines of a data driving integrated circuit corresponding to the desired resolution of the display; supplying pixel data via the data output channel set to the data lines, wherein pixel data is not supplied to non-selected output channels; enabling one of a plurality of scan lines; and supplying the pixel data from the data lines to liquid crystal cells connected to the enabled scan line.

It is to be understood that both the foregoing general description and the following detailed description are exemplary and explanatory and are intended to provide further explanation of the invention as claimed.

BRIEF DESCRIPTION OF THE DRAWINGS

The accompanying drawings which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
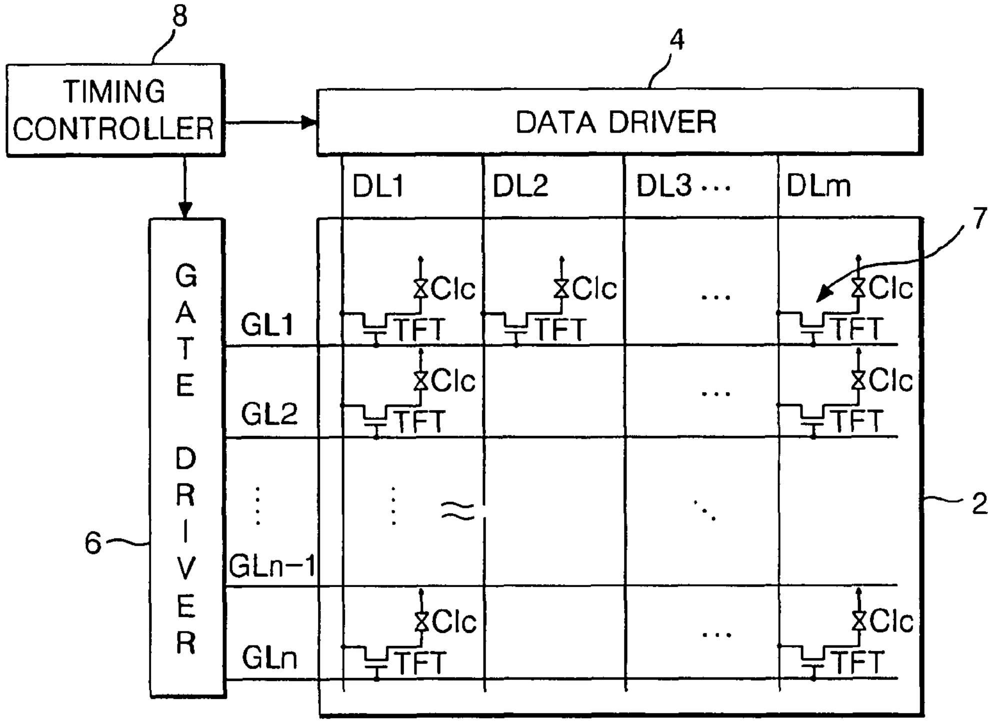
FIG. 1 RELATED ART
FIG. 1 is a block circuit diagram showing a related art liquid crystal display.
Figure 2A:
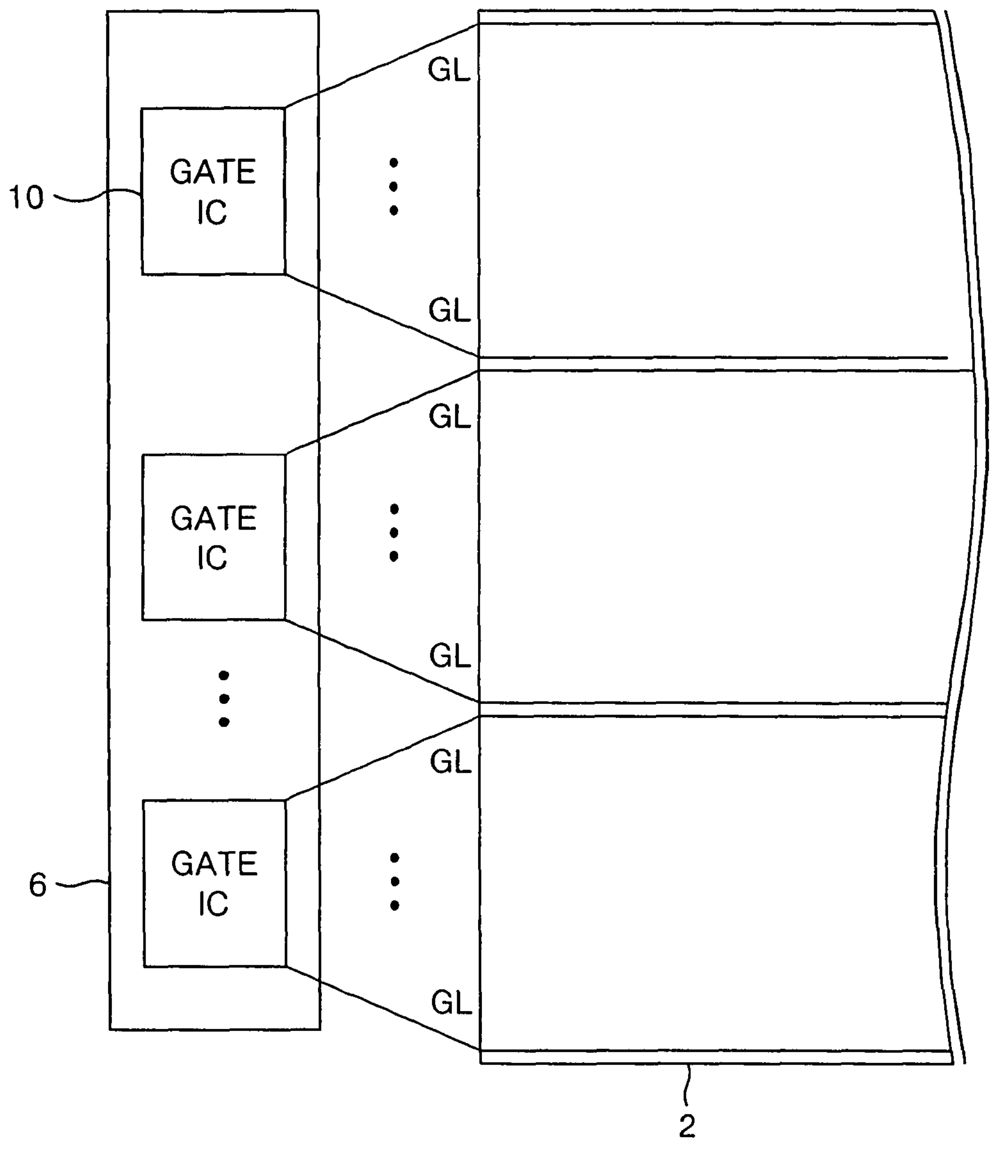
FIG. 2A RELATED ART
FIG. 2A illustrates gate integrated circuits included in a related art gate driver.
Figure 2B:
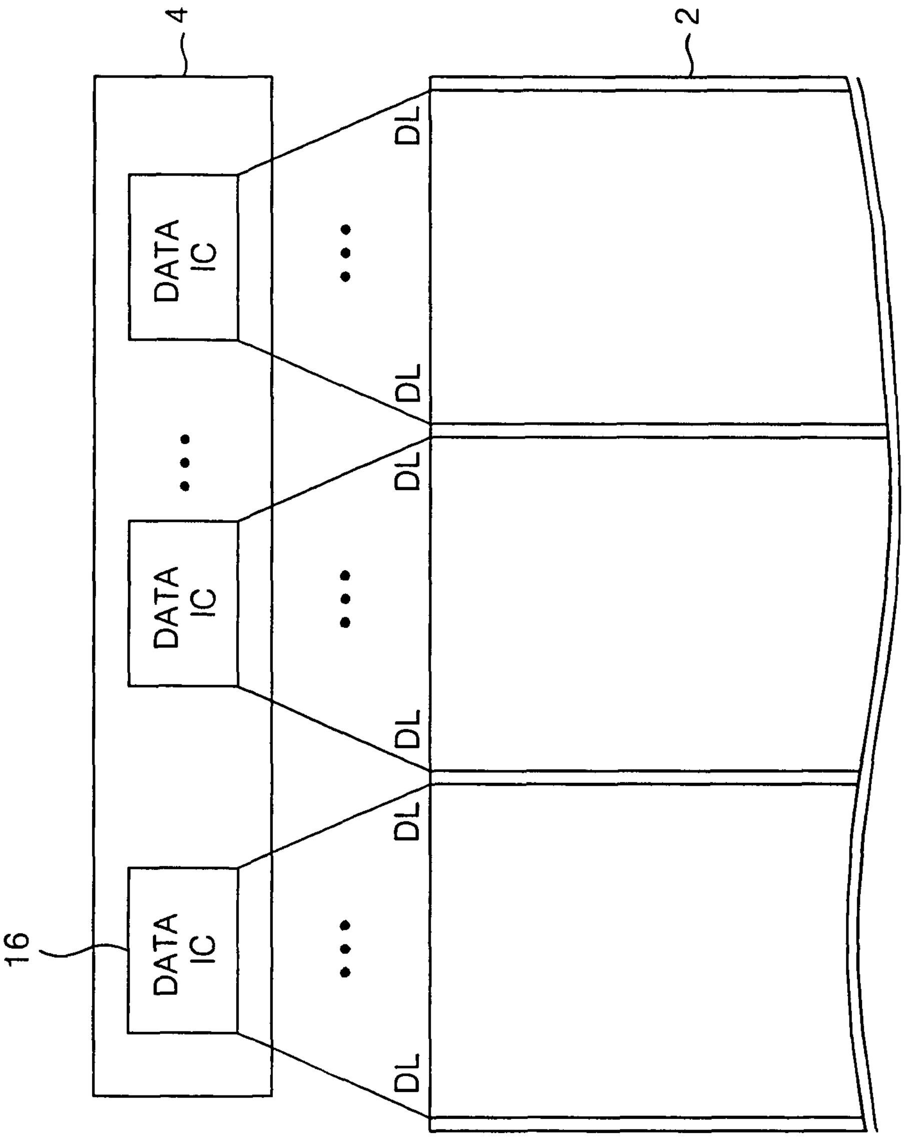
FIG.2B RELATED ART
FIG. 2B illustrates data integrated circuits included in a related art data driver.
Figure 3:
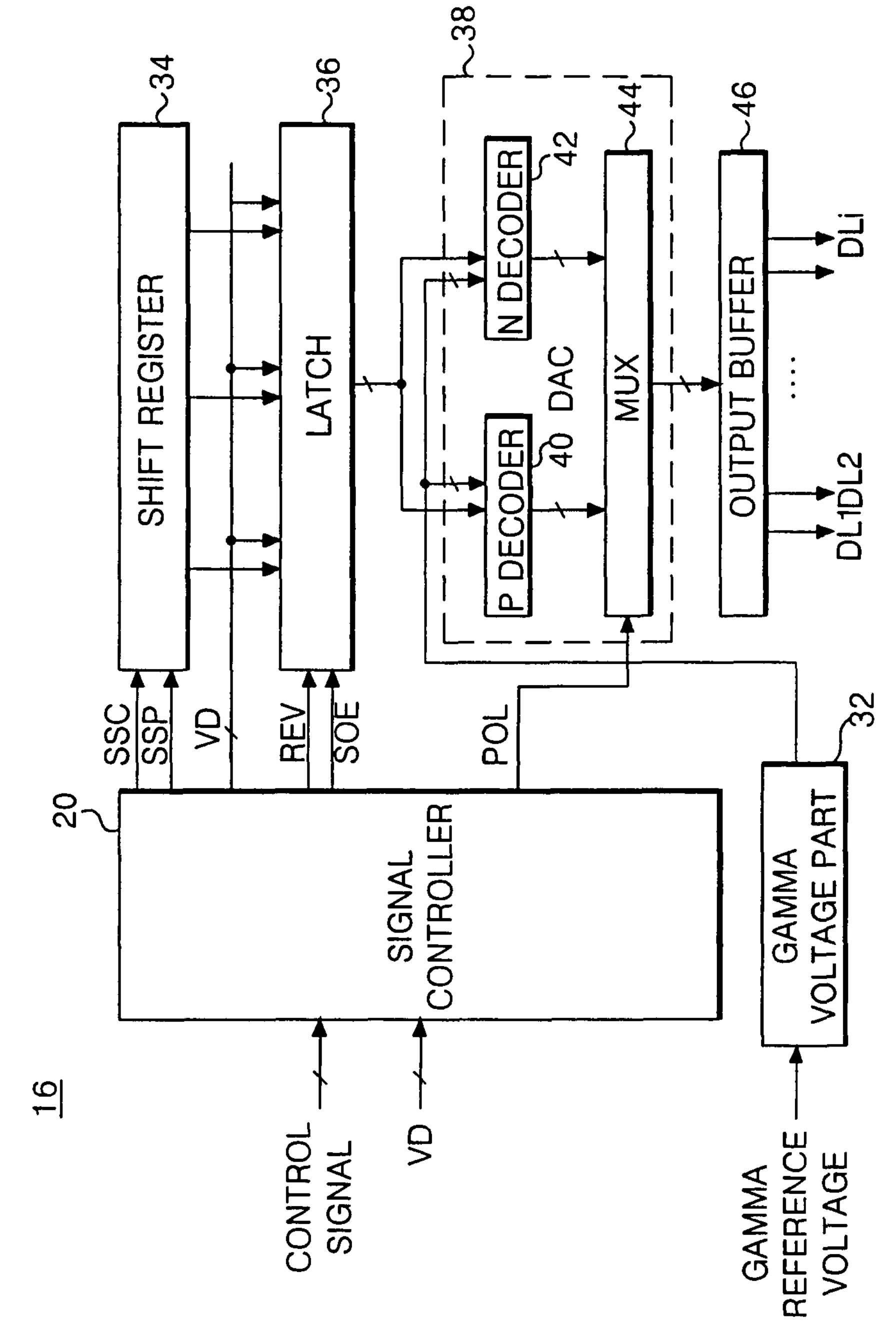
FIG. 3 RELATED ART
FIG. 3 is a block diagram showing an internal configuration of the data integrated circuit in FIG. 2B.
Figure 4:
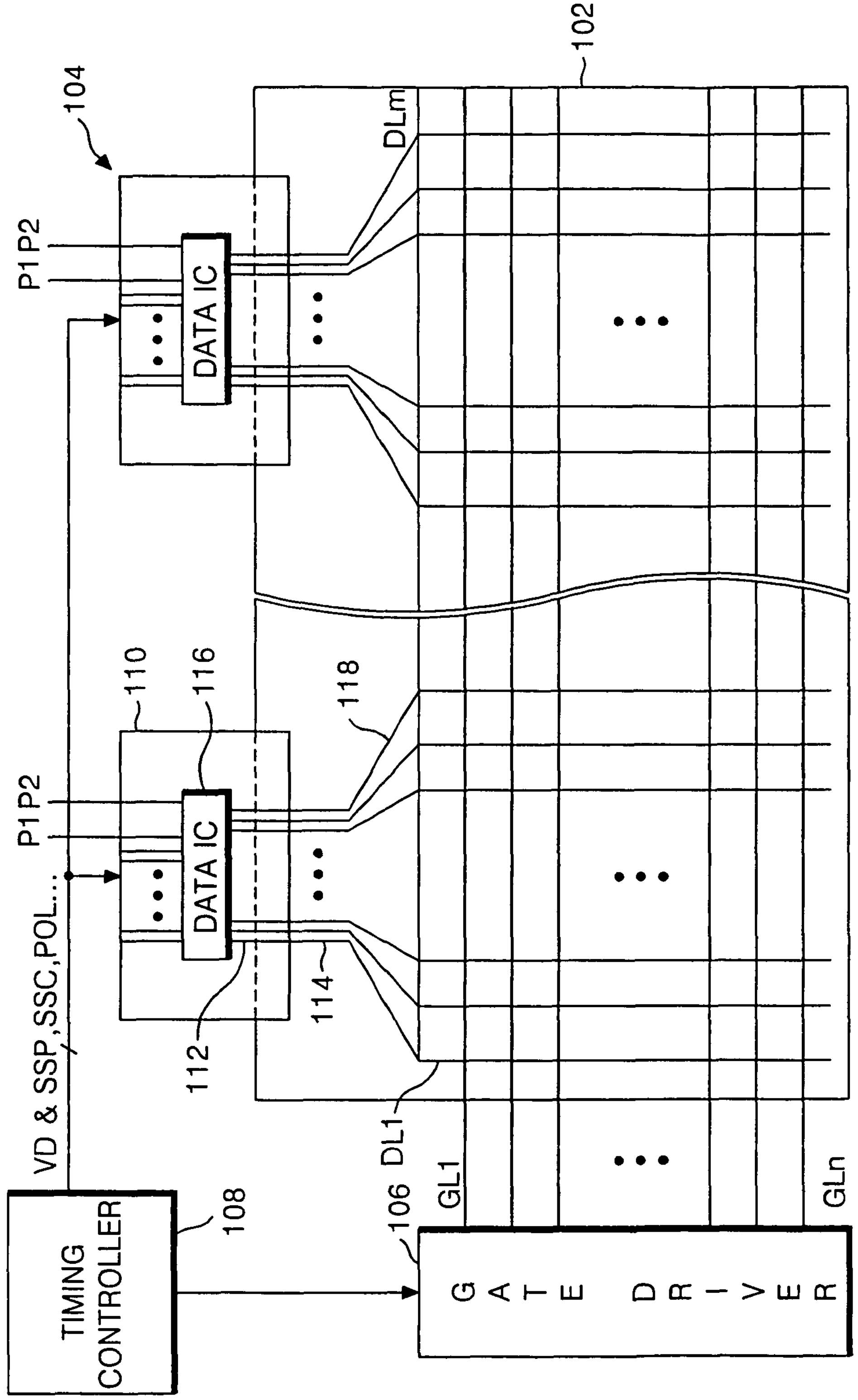
FIG. 4 is a block circuit diagram showing a liquid crystal display according to a first embodiment of the present invention.

FIG. 4 schematically shows a liquid crystal display (LCD) according to a first embodiment of the present invention.

In FIG. 4, the LCD includes a liquid crystal display panel 102 having liquid crystal cells provided at crossings of data lines DL1 to DLm and gate lines GL1 to GLn, a data driver 104 provided with a plurality of data ICs 116, each of which has N output channels (wherein N is an integer), for supplying pixel data, via the output channels, to N data lines or less; a gate driver 106 provided with a plurality of gate integrated circuits for sequentially applying a scanning pulse to the gate lines GL1 to GLn, a channel selector for selecting output channels of the plurality of data ICs 116 that output the pixel data in accordance with the number of data lines DL1 to DLm, and a timing controller 108 for controlling drive timing signals of each of the data driver 104 and the gate driver 106 and for applying data corresponding to the selected output channel to each data IC 116.

The liquid crystal display panel 102 includes a thin film transistor TFT provided at each crossing of the gate lines GL1 to GLn and the data lines DL1 to DLm connected to the thin film transistor TFT, and a liquid crystal cell (not shown). The thin film transistor TFT is turned on when supplied with a scanning signal, i.e., a gate high voltage VGH from the gate line GL, to apply a pixel signal from the data line DL to the liquid crystal cell. Further, the thin film transistor TFT is turned off when supplied with a gate low voltage VGL from the gate line GL. The pixel signal remains charged in the liquid crystal cell.

The liquid crystal cell can be equivalently represented as a liquid crystal capacitor. The liquid crystal cell includes a pixel electrode connected with a common electrode and a thin film transistor with a liquid crystal therebetween. Further, the liquid crystal cell includes a storage capacitor to maintain a stable level of the charged pixel signal until the next pixel signal is applied. The storage capacitor is provided between the pixel electrode and the pre-stage gate line. Such a liquid crystal cell varies an alignment state of the liquid crystal having a dielectric anisotropy in accordance with a pixel signal charged through the thin film transistor TFT to control a light transmittance, thereby implementing gray scale levels.

The timing controller 108 generates gate control signals (i.e., gate start pulse (GSP), gate shift clock (GSC) and gate output enable (GOE)) and data control signals (i.e., source start pulse (SSP), source shift clock (SSC), source output enable (SOE) and polarity control (POL)) using synchronizing signals V and H supplied from a video card (not shown). The gate control signals (i.e., GSP, GSC and GOE) are applied to the gate driver 106 to control the gate driver 106 while the data control signals (i.e., SSP, SSC, SOE and POL)

are applied to the data driver 104 to control the data driver 104. Further, the timing controller 108 aligns pixel data VD and applies the pixel data to the data driver 104.

The gate driver 106 sequentially drives the gate lines GL1 to GLn. The gate driver 106 includes a plurality of gate integrated circuits (ICs) (not shown). The gate ICs sequentially drive the gate lines GL1 to GLn connected thereto under control of the timing controller 108. In other words, the gate ICs sequentially apply a gate high voltage VGH to the gate lines GL1 to GLn in response to the gate control signals (i.e., GSP, GSC and GOE) from the timing controller 108.

More specifically, the gate driver 106 shifts a gate start pulse GSP in response to a gate shift clock GSC to generate a shift pulse. Then, the gate driver 106 applies a gate high voltage VGH to the corresponding gate line GL every horizontal period in response to the shift pulse. The shift pulse is shifted line-by-line every horizontal period, and any one of the gate ICs applies the gate high voltage VGH to the corresponding gate line GL in accordance with the shift pulse. In this case, the gate ICs supply a gate low voltage VGL in the remaining gate lines.

The data driver 104 applies pixel signals to the data lines DL1 to DLm, one line at a time, every horizontal period. To this end, the data driver 104 includes a plurality of data ICs 116. Each of the data ICs 116 may be mounted in a data tape carrier package (TCP) 110. Such data ICs 116 are electrically connected, via a data TCP pad 112, a data pad 114 and a link 118, to the data lines DL1 to DLm. The data ICs 116 apply pixel signals to the data lines DL1 to DLm in response to data control signals (i.e., SSP, SSC, SOE and POL) from the timing controller 108. In this case, the data ICs 116 convert pixel data VD from the timing controller 108 to analog pixel signals using gamma voltages from a gamma voltage generator (not shown).

The data ICs 116 shift a source start pulse SSP from the timing controller 108 in response to a source shift clock SSC to generate sampling signals. Then, the data ICs 116 sequentially latch the pixel data VD for a certain unit in response to the sampling signals. Thereafter, the data ICs 116 convert the latched pixel data VD for one line to analog pixel signals, and apply them to the data lines DL1 to DLm in an enable interval of a source output enable signal SOE. The data ICs 116 convert the pixel data VD to positive or negative pixel signals in response to a polarity control signal POL.

Each of the data ICs 116 of the LCD according to the first embodiment of the present invention varies an output channel for applying a pixel signal to each data line DL1 to DLm in response to first and second channel selection signals P1 and P2 input from the exterior thereof. To this end, each of the data ICs 116 includes first and second option pins OP1 and OP2, for example, supplied with the first and second channel selection signals P1 and P2.

Each of the first and second option pins OP1 and OP2 is selectively connected to a voltage source VCC and a ground voltage source GND to have a 2-bit binary logical value. Thus, the first and second channel selection signals P1 and P2 apply, via the first and second option pins OP1 and OP2, logical values of ‘00’, ‘01’, ‘10’ and ‘11’ to the data IC 116.

Accordingly, each of the data ICs 116 has the number of output channels set in advance depending on a resolution type of the liquid crystal display panel 102 using first and second channel selection signals P1 and P2 applied via the first and second option pins OP1 and OP2.

The number of data ICs 116 according to output channels of the data ICs 116 based upon a resolution type of the liquid crystal display panel 102 is described in Table 1:

TABLE 1

| | Pixel number | | The number of data ICs according to output channels of data ICs | | | |
|---|---|---|---|---|---|---|
| Resolution | Data line | Gate line | 600CH | 618CH | 630CH | 642CH |
| XGA | 3072 | 768 | 5.12 | 4.97 | 4.88 | 4.79 |
| SXGA+ | 4200 | 1050 | 7.00 | 6.80 | 6.67 | 6.54 |
| UXGA | 4800 | 1200 | 8.00 | 7.77 | 7.62 | 7.48 |
| WXGA | 3840 | 800 | 6.40 | 6.21 | 6.10 | 5.98 |
| WSXGA− | 4320 | 900 | 7.20 | 6.99 | 6.86 | 6.73 |
| WSXGA | 5040 | 1050 | 8.40 | 8.16 | 8.00 | 7.85 |
| WUXGA | 5760 | 1200 | 9.60 | 9.32 | 9.14 | 8.97 |

In the above Table 1, all resolution types can be expressed by four channels. Specifically, the liquid crystal display panel 102 having a resolution of XGA class requires five data ICs 116, each of which has 618 data output channels. In this case, the remaining 18 data output channels are treated as dummy lines. The liquid crystal display panel 102 having a resolution of SXGA+ class requires seven data ICs 116, each of which has 600 data output channels. The liquid crystal display panel 102 having a resolution of Ultra eXtended Graphics Adapter (UXGA) class requires eight data ICs 116, each of which has 600 data output channels. The liquid crystal display panel 102 having a resolution of WXGA class requires six data ICs 116, each of which has 642 data output channels. The liquid crystal display panel 102 having a resolution of Wide aspect Super eXtended Graphics Adapter− (WSXGA−) class requires seven data ICs 116, each of which has 618 data output channels. The liquid crystal display panel 102 having a resolution of Wide aspect Super eXtended Graphics Adapter (WSXGA) class requires eight data ICs 116, each of which has 630 data output channels. The liquid crystal display panel 102 having a resolution of Wide aspect Ultra eXtended Graphics Adapter (WUXGA) class requires nine data ICs 116, each of which has 642 data output channels.

The LCD according to the first embodiment of the present invention sets the number of output channels of the data ICs 116 to any one of 600 channels, 618 channels, 630 channels and 642 channels in response to the first and second channel selection signals P1 and P2; thereby, expressing all resolution types of the liquid crystal display panel 102. The data IC 116 of the LCD according to the first embodiment of the present invention may be made to have 642 data output channels and the number of active output channels of the data ICs 116 set in response to the first and second channel selection signals P1 and P2 from the first and second option pins OP1 and OP2, for example, so that it can be compatibly used for all resolution types of the liquid crystal display panel 102.

Figure 5:
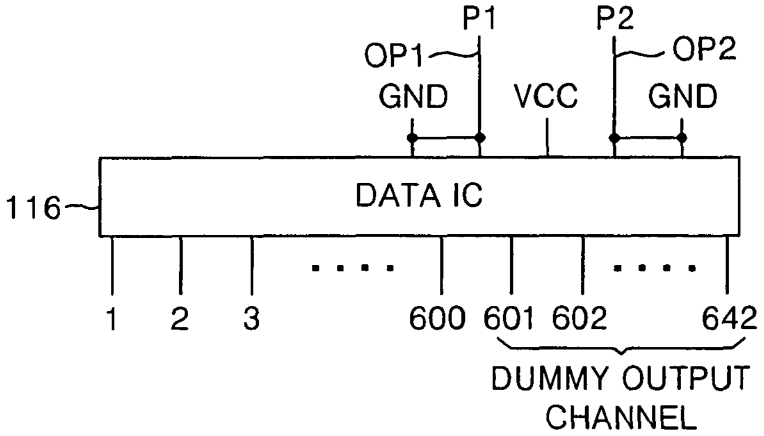
FIG. 5 illustrates a data integrated circuit set to have 600 data output channels in accordance with first and second output selection signals shown in FIG. 4.
Figure 6:
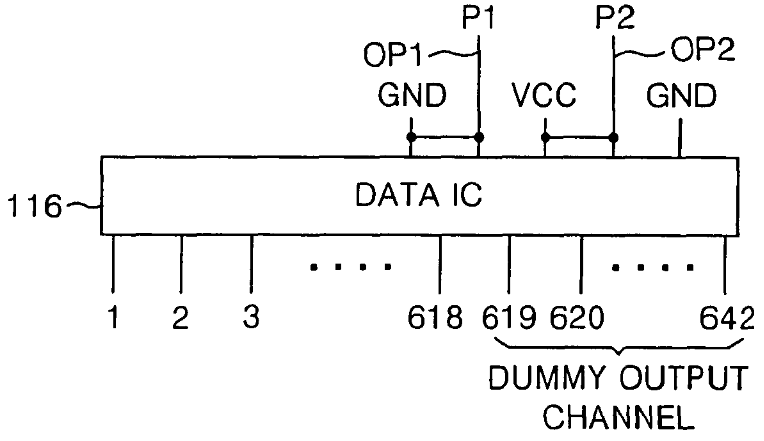
FIG. 6 illustrates a data integrated circuit set to have 618 data output channels in accordance with first and second output selection signals shown in FIG. 4.
Figure 7:
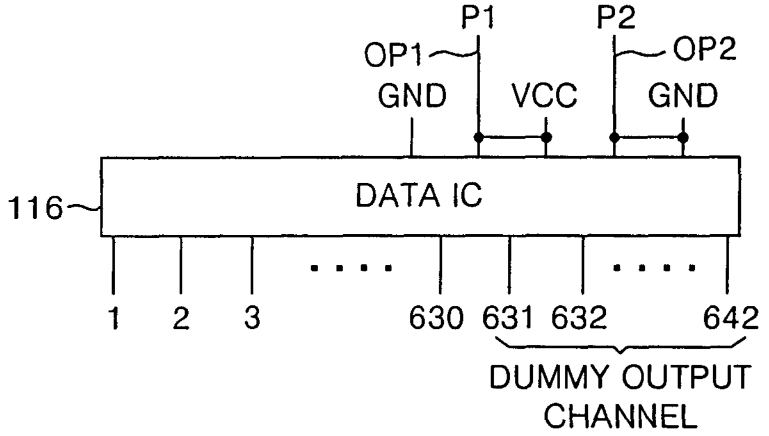
FIG. 7 illustrates a data integrated circuit set to have 630 data output channels in accordance with first and second output selection signals shown in FIG. 4.
Figure 8:
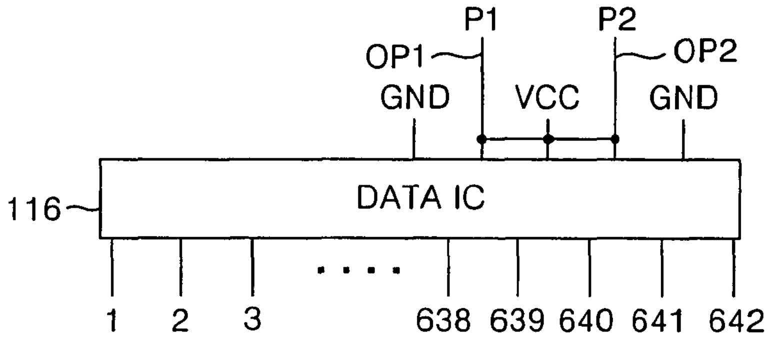
FIG. 8 illustrates a data integrated circuit set to have 642 data output channels in accordance with first and second output selection signals shown in FIG. 4.

More specifically, the data IC 116 of the LCD according to the first embodiment of the present invention may be manufactured to have 642 data output channels. When a logical value of the first and second channel selection signals P1 and P2 applied to the data IC 116 is ‘00’ by connecting each of the first and second option pins OP1 and OP2 to the ground voltage source GND, the data IC 116 outputs pixel voltage signals via only the 1st to 600th data output channels from the 642 data output channels available, as shown in FIG. 5. The 601st to 642nd output channels become dummy output channels. On the other hand, when a logical value of the first and second channel selection signals P1 and P2 applied to the data IC 116 is ‘01’, by connecting the first option pin OP1 to the ground voltage source GND and the second option pin OP2 to the voltage source VCC, the data IC 116 outputs pixel voltage signals via only the 1st to 618th data output channels from the 642 data output channels available, as shown in FIG. 6. In this case, the 619th to 642nd output channels become dummy output channels. When a logical value of the first and second channel selection signals P1 and P2 applied to the data IC 116 is '10' by connecting the first option pin OP1 to the voltage source VCC and the second option pin OP2 to the ground voltage source GND, the data IC 116 outputs pixel voltage signals via only the 1st to 630th data output channels from the 642 data output channels available, as shown in FIG. 7. In this case, the 631st to 642nd output channels become dummy output channels. Finally, when a logical value of the first and second channel selection signals P1 and P2 applied to the data IC 116 is '11' by connecting the first and second option pins OP1 and OP2 to the voltage source VCC, the data IC 116 outputs pixel voltage signals via the 1st to 642nd data output channels, as shown in FIG. 8.

Figure 9:
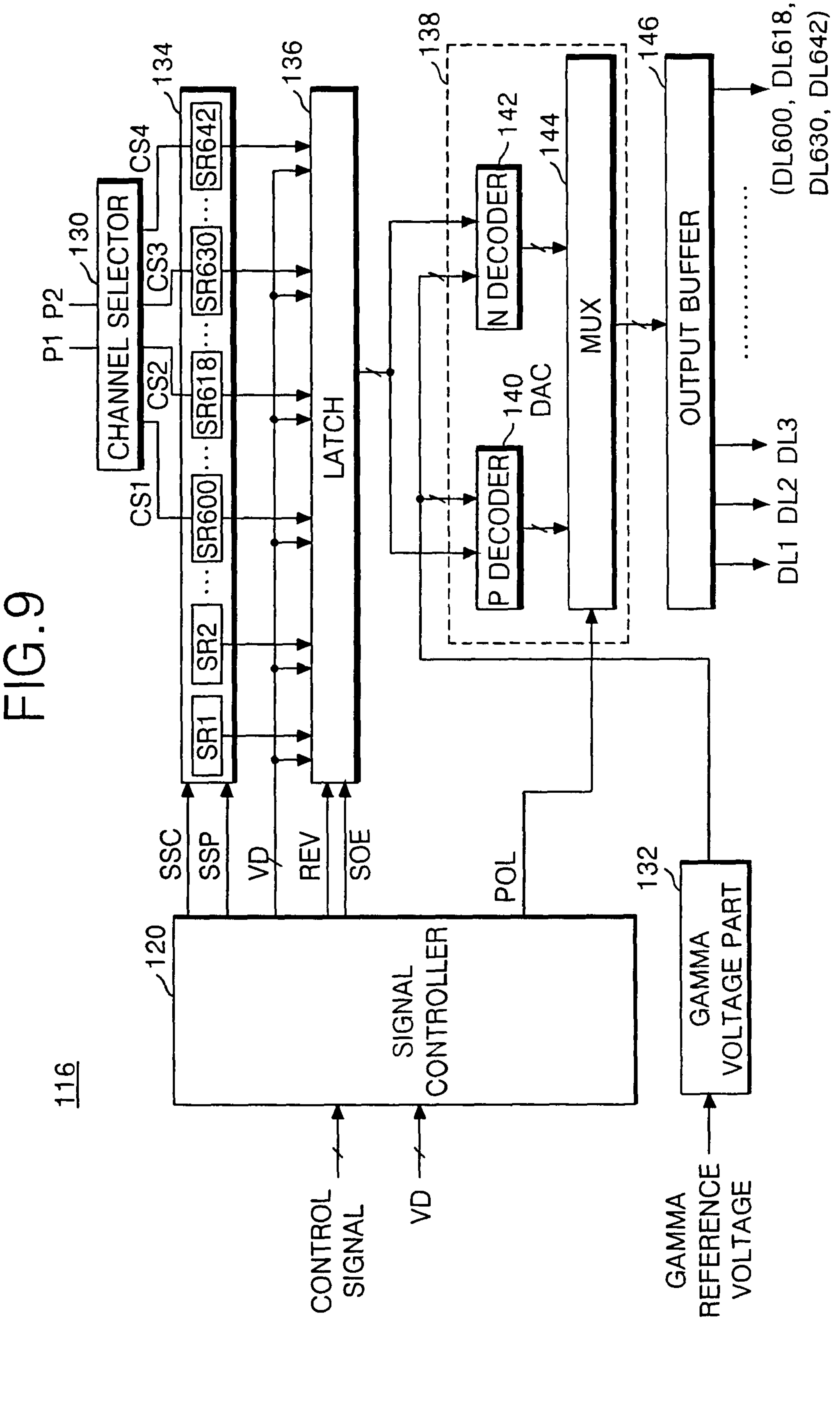
FIG. 9 is a block diagram showing an internal configuration of the data integrated circuit in FIG. 4.

As shown in FIG. 9, the data IC 116 of the LCD according to the first embodiment of the present invention includes a channel selector 130 for setting an output channel of the data IC 116 in response to the first and second channel selection signals P1 and P2 applied to the first and second option pins OP1 and OP2, for example, a shift register part 134 for applying sequential sampling signals, a latch part 136 for sequentially latching the pixel data VD in response to the sampling signals to output them simultaneously, a digital-to-analog converter (DAC) 138 for converting the pixel data VD from the latch part 136 to pixel voltage signals, and an output buffer part 146 for buffering pixel voltage signals from the DAC 138 to output them.

Further, the data IC 116 includes a signal controller 120 for interfacing with various control signals from the timing controller 108 and the pixel data VD, and a gamma voltage part 132 for supplying positive and negative gamma voltages required for the DAC 138.

The signal controller 120 controls various control signals (i.e., SSP, SSC, SOE, REV and POL, etc.) from the timing controller 108 and the pixel data VD so as to output them to the corresponding elements.

The gamma voltage part 132 sub-divides a plurality of gamma reference voltages input from a gamma reference voltage generator (not shown) for each gray level.

The channel selector 130 applies first to fourth channel control signals CS1 to CS3, via the first and second option pins OP1 and OP2, to the shift register part 134 in response to the first and second channel selection signals P1 and P2. The channel selector 130 generates the first channel selection signal CS1 corresponding to the first and second channel selection signals P1 and P2 having a value of '00', the second channel selection signal CS2 corresponding to the first and second channel selection signals P1 and P2 having a value of '01', the third channel selection signal CS3 corresponding to the first and second channel selection signals P1 and P2 having a value of '10', and the fourth channel selection signal CS4 corresponding to the first and second channel selection signals P1 and P2 having a value of '11'.

Shift registers included in the shift register part 134 sequentially shift a source start pulse SSP from the signal controller 120 in response to a source sampling clock signal SSC and output sampling signal. In this example, the shift register part 134 consists of 642 shift registers SR1 to SR642.

Such a shift register part 134 applies output signals of the 600th, 618th, 630th and 642nd shift registers SR600, SR628, SR630 and SR642 to the next stage data IC 116 in response to the first to fourth channel control signals CS1 to CS4 from the channel selector 130.

When the first output control signal CS1 is applied from the channel selector 130, the shift register part 134 sequentially shifts a source start pulse SSP from the signal controller 120 in response to a source sampling clock signal SSC using the 1st to 600th shift registers SR1 to SR600, and outputs them as sampling signals. In this case, an output signal (i.e., a carry signal) of the 600th shift register SR600 is applied to the 1st shift register SR1 of the next stage data IC 116 (for a daisy chain connection). Thus, the 601st to 642nd shift registers SR601 to SR642 do not output sampling signals. Herein, if the shift registers are driven in a bilateral direction, then it becomes possible to more advantageously use them by making a dummy treatment without employing 42 middle channels.

When the second output control signal CS2 is applied from the channel selector 130, the shift register part 134 sequentially shifts a source start pulse SSP from the signal controller 120 in response to a source sampling clock signal SSC using the 1st to 618th shift registers SR1 to SR618, and outputs them as sampling signals. An output signal (i.e., a carry signal) of the 618th shift register SR618 is applied to the 1st shift register SR1 of the next stage data IC 116. Thus, the 619th to 642nd shift registers SR619 to SR642 do not output sampling signals. Herein, if the shift registers are driven in a bilateral direction, then it becomes possible to more advantageously use them by making a dummy treatment without employing 24 middle channels.

When the third output control signal CS3 is applied from the channel selector 130, the shift register part 134 sequentially shifts a source start pulse SSP from the signal controller 120 in response to a source sampling clock signal SSC using the 1st to 630th shift registers SR1 to SR630, and outputs them as sampling signals. In this case, an output signal (i.e., a carry signal) of the 630th shift register SR630 is applied to the 1st shift register SR1 of the next stage data IC 116. Thus, the 631st to 642nd shift registers SR601 to SR642 do not output sampling signals. Herein, if the shift registers are driven in a bilateral direction, then it becomes possible to more advantageously use them by making a dummy treatment without employing 12 middle channels.

When the fourth output control signal CS4 is applied from the channel selector 130, the shift register part 134 sequentially shifts a source start pulse SSP from the signal controller 120 in response to a source sampling clock signal SSC using the 1st to 642nd shift registers SR1 to SR642, and outputs them as sampling signals. In this case, an output signal (i.e., a carry signal) of the 642nd shift register SR642 is applied to the 1st shift register SR1 of the next stage data IC 116.

The latch part 136 sequentially samples the pixel data VD from the signal controller 120 for a time period in response to the sampling signals from the shift register part 134 to latch them. To this end, the latch part 136 is comprised of at most 642 latches so as to latch 642 channels of pixel data VD, and each of the latches has a dimension corresponding to the bit number of the pixel data VD. The timing controller 108 divides the pixel data VD into even pixel data $VD_{even}$ and odd pixel data $VD_{odd}$ to reduce a transmission frequency, and simultaneously outputs the pixel data through each transmission line. Each of the even pixel data $VD_{even}$ and the odd pixel data $VD_{odd}$ includes red (R), green (G) and blue (B) pixel data.

The latch part 136 simultaneously latches the even pixel data $VD_{even}$ and the odd pixel data $VD_{odd}$ supplied via the signal controller 120 for each sampling signal. Then, the latch part 136 simultaneously outputs the pixel data VD through the selected number of output channels (600, 618, 630 or 642 data output channels) in response to a source output enable signal SOE from the signal controller 120. The latch part 136 restores pixel data VD which have been modulated such that the transition bit number is reduced in response to a data inversion selection signal REV. The timing controller 8 modulates the pixel data VD, such that the number of transition bits are minimized using a reference value to determine whether the bits should be inverted or not. This minimizes an electromagnetic interference (EMI) upon data transmission due to a minimal number of bit transitions from LOW to HIGH or HIGH to LOW.

The DAC 138 simultaneously converts the pixel data VD from the latch part 136 to positive and negative pixel voltage signals and outputs them. The DAC 138 includes a positive (P) decoding part 140 and a negative (N) decoding part 142 commonly connected to the latch part 136, and a multiplexer (MUX) part 144 for selecting output signals of the P decoding part 140 and the N decoding part 142.

The n P decoders included in the P decoding part 140 convert n pixel data input simultaneously from the latch part 136 into positive pixel voltage signals using positive gamma voltages from the gamma voltage part 132. The i N decoders included in the N decoding part 142 convert i pixel data input simultaneously from the latch part 136 to negative pixel voltage signals using negative gamma voltages from the gamma voltage part 132. In this example, at most, 642 multiplexers included in the multiplexer part 144 selectively output the positive pixel voltage signals from the P decoder 140 or the negative pixel voltage signals from the N decoder 142 in response to a polarity control signal POL from the signal controller 120.

At most, 642 output buffers included in the output buffer part 146 are comprised of voltage followers, etc. connected in series, to the respective 642 data lines DL1 to DL642. Such output buffers buffer pixel voltage signals from the DAC 138 to apply them to the data lines DL1 to DL642.

In the LCD according to the first embodiment of the present invention, the data IC 116 having 600 data output channels may be used for a liquid crystal display panel 102 having a resolution of SXGA+ class or UXGA class; the data IC 116 having 618 data output channels may be used for a liquid crystal display panel 102 having a resolution of XGA class or WSXGA− class; the data IC 116 having 630 data output channels may be used for a liquid crystal display panel 102 having a resolution of WSXGA class; and the data IC 116 having 642 data output channels may be used for a liquid crystal display panel 102 having a resolution of WXGA class or WUXGA class as indicated in the above Table 1.

The data IC 116 of the LCD according to the first embodiment of the present invention includes the TCP pad 112, the data pad 114 of the liquid crystal display panel 102 and the link 118 that correspond to output channels of the data IC 116 varied in response to the first and second output selection signals P1 and P2.

As described above, the LCD according to the first embodiment of the present invention sets the number of output channels of the data IC 116 in accordance with a resolution type of the liquid crystal display panel 102 as indicated in the above Table 1 using the first and second channel selection signals P1 and P2 applied to the first and second option pins OP1 and OP2, thereby configuring multiple resolution types using only one type of data IC 116. Accordingly, the LCD according to the first embodiment of the present invention is capable of improving working efficiency as well as reducing manufacturing costs.

Figure 10:
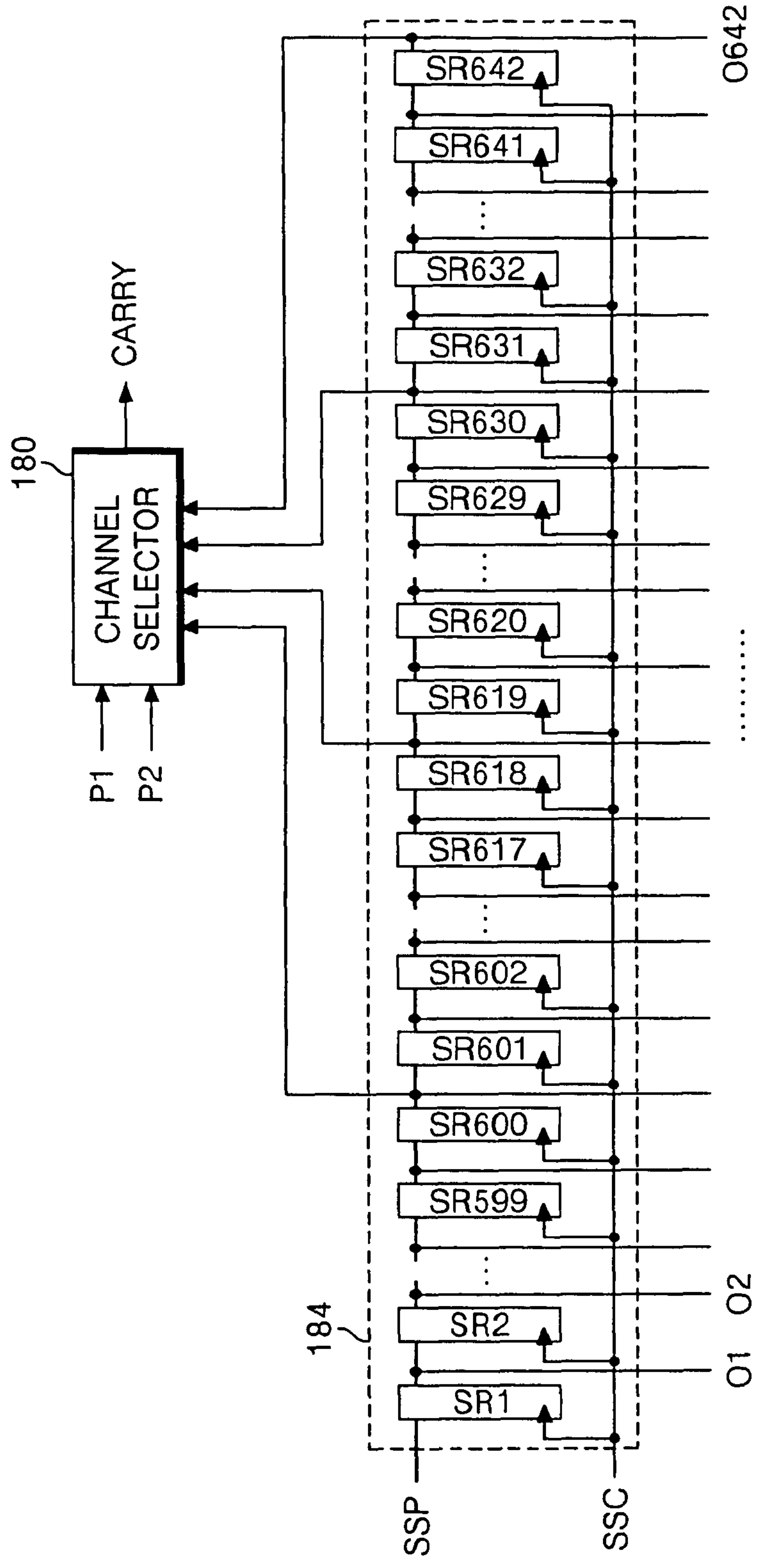
FIG. 10 is a block diagram showing a channel selector and a shift register part of a data integrated circuit in a liquid crystal display according to a second embodiment of the present invention.

FIG. 10 is a block diagram showing a shift register part 184 and a channel selector 180 of a data IC in a liquid crystal display according to a second embodiment of the present invention.

In FIG. 10, the LCD according to the second embodiment of the present invention has the same elements as the LCD according to the first embodiment of the present invention except for the shift register part 184 and the channel selector 180. In the LCD according to the second embodiment of the present invention, only the shift register part 184 and the channel selector 180 will be described in conjunction with FIG. 10 and FIG. 4.

In the LCD according to the second embodiment of the present invention, the channel selector 180 applies an output signal (i.e., a carry signal) from the shift register part 184, via the first and second option pins OP1 and OP2, to the next stage of a data IC 216 in response to the first and second channel selection signals P1 and P2. The channel selector 180 employs a multiplexer to output any one of four inputs in response to two binary logical control signals.

Shift registers SR1 to SR642 included in the shift register part 184 sequentially shift a source start pulse SSP from the signal controller 120 in response to a source sampling clock signal SSC and output sampling signals. In this example, the shift register part 184 consists of 642 shift registers SR1 to SR642.

In the shift register part 184, output signals of the 600th, 618th, 630th and 642nd shift registers SR600, SR628, SR630 and SR642, of the 642 shift registers, are applied as first to fourth input signals of the channel selector 180, respectively. For example, an output signal of the 600th shift register SR600 is applied as the first input signal of the channel selector 180, and is applied as an input signal of the 601th shift register SR601.

The channel selector 180 may apply any one of output signals of the 600th, 618th, 630th and 642nd shift registers SR600, SR628, SR630 and SR642 to the next stage of the data IC 216 as a carry signal in accordance with a binary logical value of the first and second selection signals P1 and P2.

More specifically, the channel selector 180 may apply an output signal from the 600th shift register SR600 to the first shift register SR1 of the next stage of the data IC 216 in response to the first and second channel selection signals P1 and P2 having a value of "00". Because the 601st to 642nd shift registers, SR601 to SR642, sequentially output sampling signals and are not connected to the data lines DL, they have no effect on the liquid crystal display panel 102. If the shift registers are driven in a bilateral direction, then it becomes possible to more advantageously use them in making a dummy treatment without employing 42 middle channels.

The channel selector 180 may apply an output signal from the 618th shift register SR618 to the first shift register SR1 of the next stage of the data IC 216 in response to the first and second channel selection signals P1 and P2 having a value of "01". Because the 619th to 642nd shift registers SR619 to SR642 sequentially output sampling signals and are not connected to the data lines DL, they have no effect on the liquid crystal display panel 102. If the shift registers are driven in a bilateral direction, then it becomes possible to more advantageously use them in making a dummy treatment without employing 24 middle channels.

The channel selector 180 may apply an output signal from the 630th shift register SR630 to the first shift register SR1 of the next stage of the data IC 216 in response to the first and second channel selection signals P1 and P2 having a value of "10". In this example because, the 631st to 642nd shift registers SR631 to SR642 sequentially output sampling signals and are not connected to the data lines DL, they have no effect on the liquid crystal display panel 102. However, if the shift registers are driven in a bilateral direction, then it becomes possible to more advantageously use them in making a dummy treatment without employing 12 middle channels.

Finally, the channel selector 180 may apply an output signal from the 642nd shift register SR642 to the first shift register SR1 of the next stage of the data IC 216 in response to the first and second channel selection signals P1 and P2 having a value of "11".

Each of the data ICs 216 of the LCD according to the second embodiment of the present invention, including the channel selector 180 and the shift register part 184, sequentially latch the pixel data VD for a time period in response to the sampling signal output from the shift register part 184 as disclosed above. Thereafter, the data ICs 216 convert the latched pixel data VD for one line to analog pixel signals, and apply the signals to the data lines DL1 to DLm in an enable interval of a source output enable signal SOE. The data ICs 216 convert the pixel data VD to positive or negative pixel signals in response to a polarity control signal POL.

As described above, the LCD according to the second embodiment of the present invention sets the output channels of the data IC 216 in accordance with a desired resolution of the liquid crystal display panel 102, as indicated in the above Table 1, in response to the first and second channel selection signals P1 and P2 applied to the first and second option pins OP1 and OP2, thereby realizing multiple resolutions using only one type of data IC 116. Accordingly, the LCD according to the second embodiment of the present invention improves the working efficiency of a LCD device, as well as reducing manufacturing costs of the device.

Figure 11:
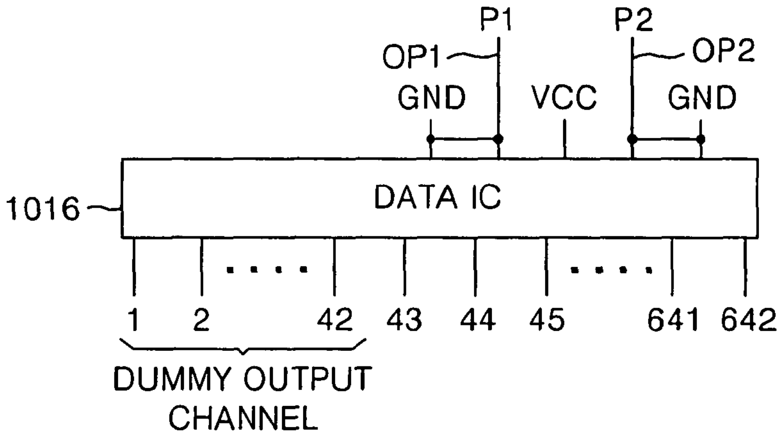
FIG. 11 illustrates a data integrated circuit set to have 600 data output channels in accordance with first and second output selection signals in a liquid crystal display according to a third embodiment of the present invention.

FIG. 11 is a block diagram showing a configuration of a data IC in a liquid crystal display according to a third embodiment of the present invention.

In FIG. 11, the LCD according to the third embodiment of the present invention has the same elements as the LCD according to the first embodiment of the present invention except for a data IC 1016. Therefore, in the LCD according to the third embodiment of the present invention, only the data IC 1016 will be described.

In the LCD according to the third embodiment of the present invention, the data IC 1016 includes a data output channel group for applying pixel data to the data lines DL, and a dummy output channel group for selecting whether or not pixel data is output in response to the first and second channel selection signals P1 and P2. Further, the data IC 1016 includes first and second option pins OP1 and OP2 supplied with first and second channel selection signals P1 and P2 for determining the dummy data output channel group.

Each of the first and second option pins OP1 and OP2 is selectively connected to a voltage source VCC and a ground voltage source GND to have a 2-bit binary logical value. Thus, the first and second channel selection signals P1 and P2 apply, via the first and second option pins OP1 and OP2, logical values of '00', '01', '10' and '11' to the data IC 1016.

Accordingly, each of the data ICs 1016 has the number of output channels set in advance based upon a resolution type of the liquid crystal display panel 102 in response to the first and second channel selection signals P1 and P2 applied via the first and second option pins OP1 and OP2.

The number of data ICs 1016 according to output channels of the data ICs 1016 is based upon a resolution type of the liquid crystal display panel 102 as indicated in the above Table 1. For example, the LCD according to the third embodiment may set the number of output channels of the data ICs 1016 to one of 600 channels, 618 channels, 630 channels and 642 channels in response to the first and second channel selection signals P1 and P2; thereby expressing all resolution types of the liquid crystal display panel 102. In other words, the data IC 1016 of the LCD according to the third embodiment of the present invention may be made to have 642 data output channels, and the number of output channels of the data ICs 1016 are set in response to the first and second channel selection signals P1 and P2 from the first and second option pins OP1 and OP2, for compatible use with multiple resolutions of the liquid crystal display panel 102.

More specifically, the data IC 1016 of the LCD according to the third embodiment of the present invention may be manufactured to have 642 data output channels.

Figure 12:
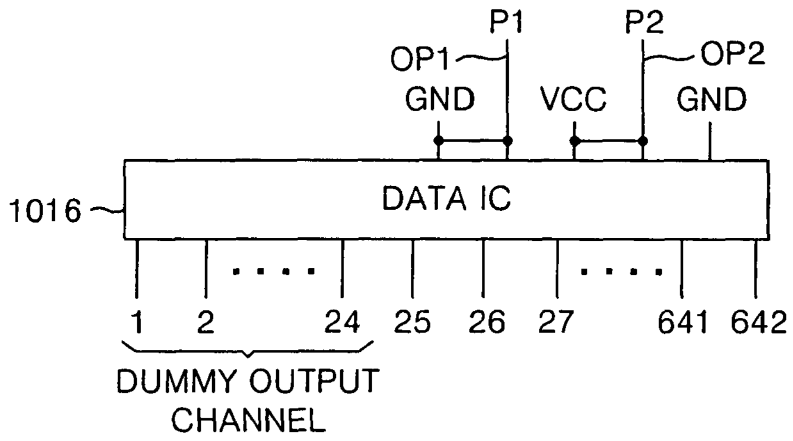
FIG. 12 illustrates a data integrated circuit set to have 618 data output channels in accordance with first and second output selection signals in the liquid crystal display according to the third embodiment of the present invention.

When a value of the first and second channel selection signals P1 and P2 applied to the data IC 1016 is '00', by connecting the first and second option pins OP1 and OP2 to the ground voltage source GND, the data IC 1016 outputs pixel voltage signals via the 43rd to 642nd output channels of the 642 available output channels, as shown in FIG. 11. In this example, the 1st to 42nd output channels form a dummy output channel group. When a value of the first and second channel selection signals P1 and P2 applied to the data IC 1016 is '01', by connecting the first option pin OP1 to the ground voltage source GND and the second option pin OP2 to the voltage source VCC, the data IC 1016 outputs pixel voltage signals via the 25th to 642nd output channels of the 642 available output channels, as shown in FIG. 12. In this example, the 1st to 24th output channels form a dummy output channel group.

Figure 13:
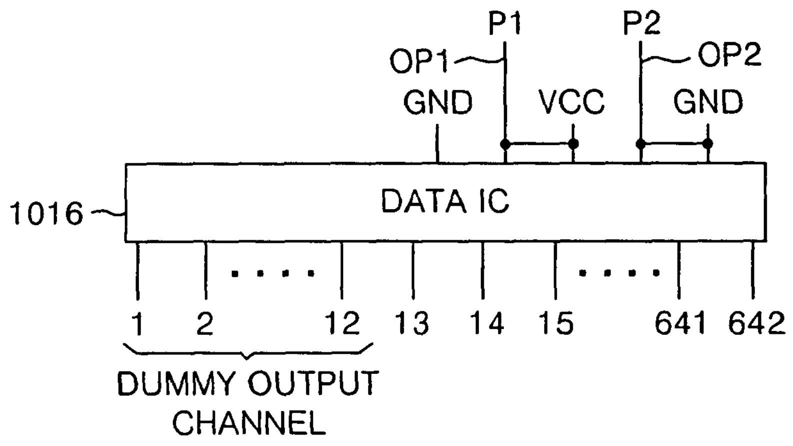
FIG. 13 illustrates a data integrated circuit set to have 630 data output channels in accordance with first and second output selection signals in the liquid crystal display according to the third embodiment of the present invention.

When a value of the first and second channel selection signals P1 and P2 applied to the data IC 1016 is '10', by connecting the first option pin OP1 to the voltage source VCC and the second option pin OP2 to the ground voltage source GND, the data IC 1016 outputs pixel voltage signals via the 13th to 642nd output channel, of the 642 available output channels, as shown in FIG. 13. In this example, the 1st to 12th output channels form a dummy output channel group.

Figure 14:
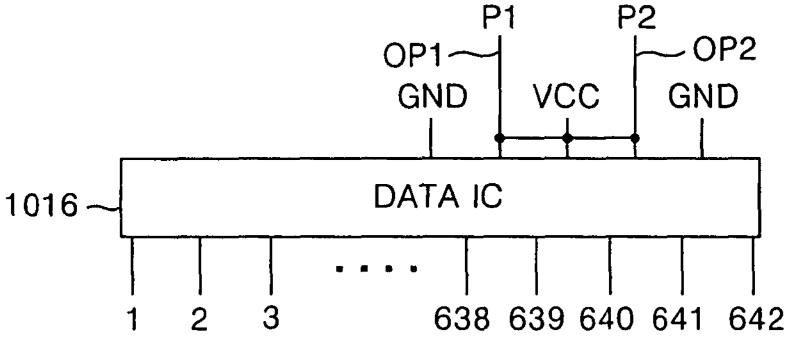
FIG. 14 illustrates a data integrated circuit set to have 642 data output channels in accordance with first and second output selection signals in the liquid crystal display according to the third embodiment of the present invention.

Finally, when a value of the first and second channel selection signals P1 and P2 applied to the data IC 1016 is '11', by connecting the first and second option pins OP1 and OP2 to the voltage source VCC, the data IC 1016 outputs pixel voltage signals via the 1st to 642nd output channels as shown in FIG. 14.

Figure 15:
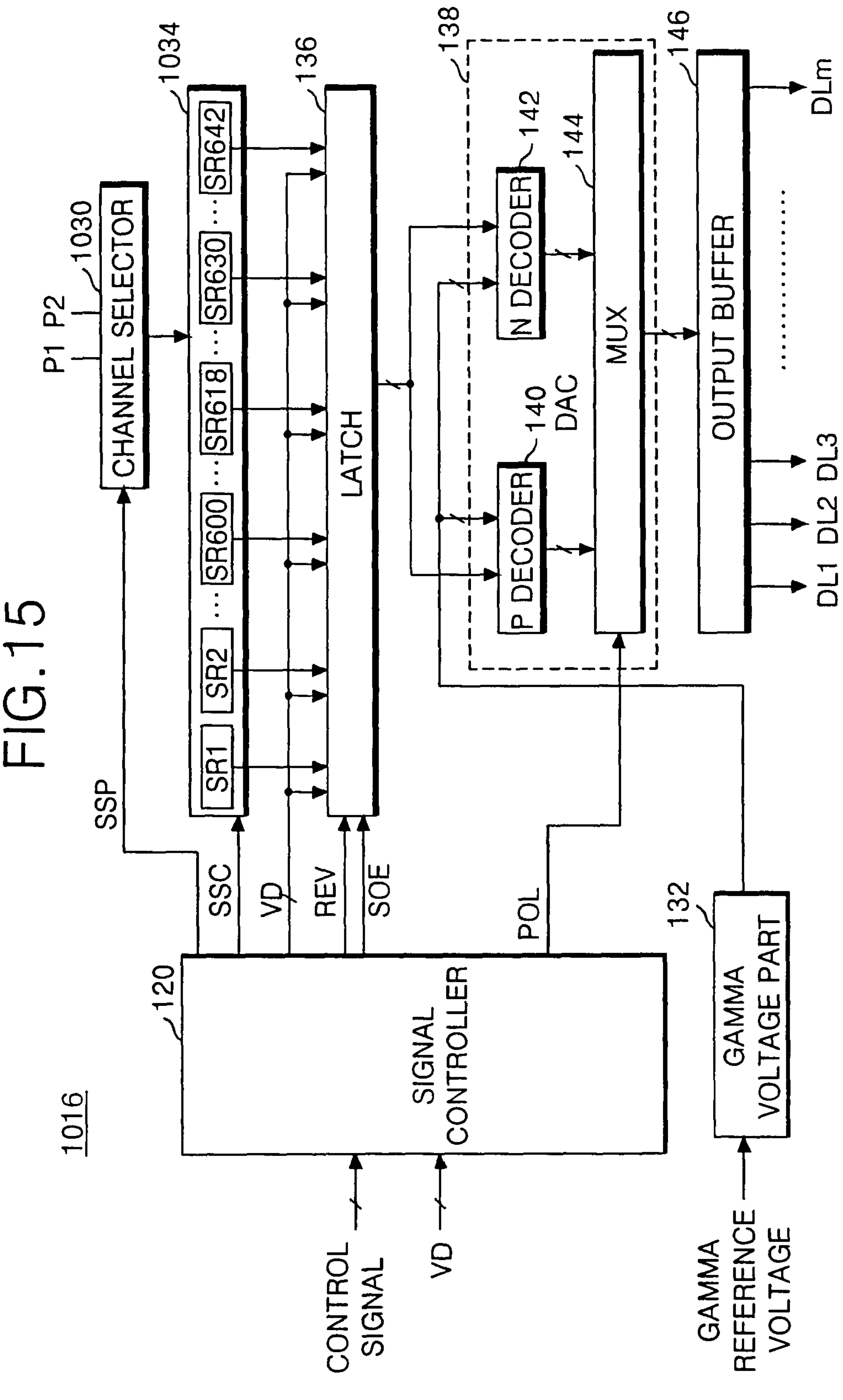
FIG. 15 is a block diagram showing a data integrated circuit in the liquid crystal display according to the third embodiment of the present invention.

As shown in FIG. 15, the data IC 1016 of the LCD according to the third embodiment of the present invention includes a channel selector 1030 for setting an output channel of the data IC 1016 in response to the first and second channel selection signals P1 and P2 applied to the first and second option pins OP1 and OP2, a shift register part 1034 for applying sequential sampling signals, a latch part 136 for sequentially latching the pixel data VD in response to the sampling signals to simultaneously output the signals, a digital-to-analog converter (DAC) 138 for converting the pixel data VD from the latch part 136 to pixel voltage signals, and an output buffer part 146 for buffering pixel voltage signals from the DAC 138 to output the signals to the data lines.

Further, the data IC 1016 includes a signal controller 120 for interfacing various control signals from the timing controller 108 and the pixel data VD, and a gamma voltage part 132 for supplying positive and negative gamma voltages required for the DAC 138.

The data IC 1016 including the latch part 136, the DAC 138, the output buffer part 146, the signal controller 120 and the gamma voltage part 132 is similar to data IC 116 of the first embodiment. However, the channel selector 1030 and the shift register part 1034 of the data IC 1016 are different and explained below.

Figure 16:
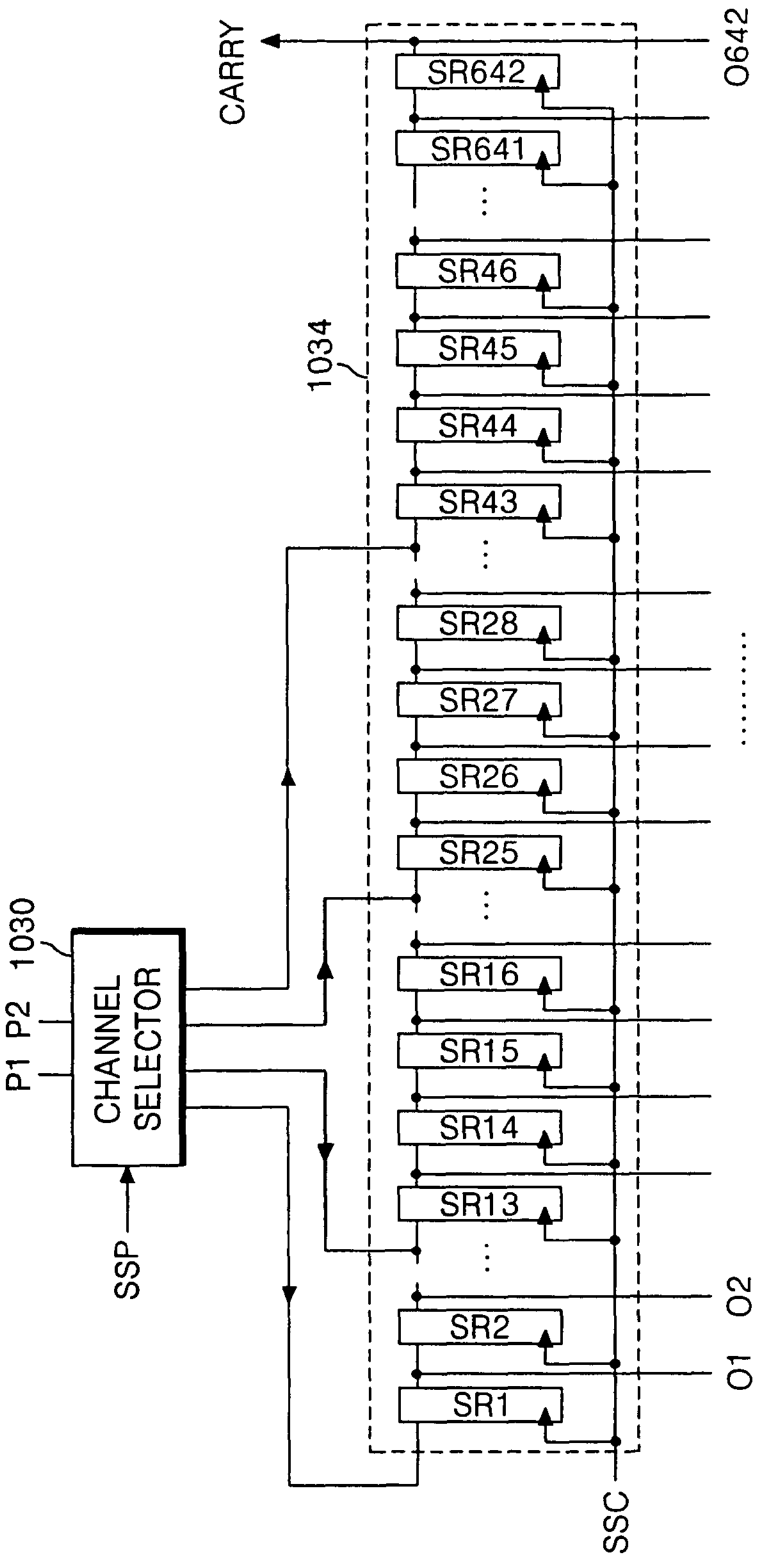
FIG. 16 is a block diagram showing a channel selector and a shift register part of a data integrated circuit in the liquid crystal display according to the third embodiment of the present invention.

In the LCD according to the third embodiment of the present invention, the channel selector 1030 of the data IC 1016 applies a source start pulse SSP from the signal controller 120 to any one of the I1th (wherein I1 is an integer smaller than N), the J1th (wherein J1 is an integer smaller than I1), the K1th (wherein K1 is an integer smaller than J1) and the L1th (wherein L1 is an integer smaller than K1) shift registers SR, as shown in FIG. 16, in response to the first and second channel selection signals P1 and P2. In this scenario, I1 becomes 43; J1 becomes 25; K1 becomes 13; and L1 becomes 1. More specifically, the channel selector 1030 may apply the source start pulse SSP to the 43rd shift register SR43 when a value of the first and second channel selection signals P1 and P2 is “00”. The channel selector 1030 may apply the source start pulse SSP to the 25th shift register SR25 when a value of the first and second channel selection signals P1 and P2 is “01”. The channel selector 1030 may apply the source start pulse SSP to the 13th shift register SR13 when a value of the first and second channel selection signals P1 and P2 is “10”. And, the channel selector 1030 may apply the source start pulse SSP to the 1st shift register SR1 when a value of the first and second channel selection signals P1 and P2 is “11”. An output signal Carry of the 642nd shift register SR642 is applied to the 1st shift register SR1 of the next stage of the data IC 1016.

The shift register part 1034 of the data IC 1016 shifts the source start pulse SSP applied to any one of the 1st, 13th, 25th and 43rd shift registers SR1, SR13, SR25 and SR43 in accordance with the first and second channel selection signals P1 and P2 in response to a source shift clock SSC to thereby sequentially generate a sampling signal. Then, the data IC 1016 generates pixel data by the same operation as the data IC in the LCD according to the first embodiment of the present invention to apply them to the data lines DL in accordance with output channels selected by the channel selector 1030.

As described above, the LCD according to the third embodiment of the present invention sets the output channels of the data IC 1016 in accordance with a resolution of the liquid crystal display panel 102 as indicated in the above Table 1 and based upon the first and second channel selection signals P1 and P2 applied to the first and second option pins OP1 and OP2, thereby expressing multiple resolution types using only one type of data IC 1016. Accordingly, the LCD according to the third embodiment of the present invention improves the working efficiency of the LCD and reduces manufacturing costs.

The LCDs according to the first to third embodiments of the present invention as described above are not limited to the varying output channels of the data ICs 116, 216 and 1016 each having 642 data output channels in response to the first and second channel selection signals P1 and P2 depicted in the figures of the present application, but may be applicable to data ICs having more or less than 642 output channels.

Furthermore, the output channels of the data ICs 116, 216 and 1016 set in response to the first and second channel selection signals P1 and P2 are not limited to the 600th, 618th, 630th and 642th data output channels, but may be applicable to any other configuration. In other words, the output channels of the data ICs 116, 216 and 1016 set in response to the first and second channel selection signals P1 and P2 may be determined based upon any one of a resolution type of the liquid crystal display panel 102, the number of TCP’s, a width of the TCP and the number of data transmission lines between the timing controller 108 for applying the pixel data to the data ICs 116, 216 and 1016 and the data ICs 116, 216 and 1016. Accordingly, the number of output channels of the data ICs 116, 216 and 1016 set in response to the first and second channel selection signals P1 and P2 may be 600, 618, 624, 630, 642, 645, 684, 696, 702 or 720, etc.

Moreover, other channel selection schemes or mechanisms may be used to control or program the data LCs to activate only the desired number of output channels in accordance with the present invention.

Also, the channel selection signals P1 and P2 for setting the output channels of the data ICs 116, 216 and 1016 are not limited to a 2-bit binary logical value, but may be a binary logical value having more than two bits.

Alternatively, the data ICs 116, 216 and 1016 according to the first to third embodiments of the present invention may be used for other flat panel display devices taking the above-mentioned LCD display panel as an example.

In accordance with the present invention, the number of channels of the data integrated circuit may be varied based upon a desired resolution of the liquid crystal display panel with the aid of the channel selection signals. Thus, all resolutions of the display panel can be driven using a particular data integrated circuit. Furthermore, according to the present invention, the data integrated circuit may be compatibly used independently of a resolution of the liquid crystal display panel, so that it becomes possible to reduce the number of data integrated circuits. As a result, according to the present invention, working efficiency is improved and manufacturing cost is reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:

a liquid crystal display panel having a plurality of liquid crystal cells formed at crossings of a plurality of data lines and a plurality of gate lines, respectively;

a data driver including a first and a second option pins, a plurality of output channels, and a plurality of data channels that are output channels supplying pixel data, supplying pixel data via the plurality of data channels to the plurality of data lines;

a gate driver for driving the plurality of gate lines;

a channel selector for selecting the plurality of data channels of the data driver in accordance with a number of the plurality of data lines, wherein the channel selector applies first to fourth channel control signals via the first and the second option pins in response to a first and a second channel control selection signals, and wherein the selected data channels are supplied with and output pixel data and non-selected data channels of the plurality of output channels are not supplied with and do not output pixel data; and a timing controller for controlling the data driver and the gate driver.

2. The liquid crystal display device according to claim 1, further comprising a selection signal generator for generating and applying a channel selection signal to select the plurality of data channels.

3. The liquid crystal display device according to claim 2, wherein the channel selector is built-in the data driver, and wherein the selection signal generator includes first and second selection terminals connected to a first voltage source and a second voltage source to generate and supply a channel selection signal to the built-in channel selector.

4. The liquid crystal display device according to claim 1, wherein the data channels are selected based upon at least one of the number of the plurality of data lines, the number of said data drivers, a width of a tape carrier package mounted to said data driver, and a number of transmission lines located between the timing controller and the data driver.

5. The liquid crystal display device according to claim 1, wherein said channel selector selects one of I and J data channels, wherein I is smaller than J, and J is smaller than the number of output channels.

6. The liquid crystal display device according to claim 1, wherein said channel selector selects one of I, J, K, and N data channels, wherein I is an integer smaller than J, J is an integer smaller than K, K is an integer smaller than N, and N is the number of output channels.

7. The liquid crystal display device according to claim 6, wherein said channel selector selects from a first output channel to any one of the Ith, Jth, Kth, and Nth output channels as the data channels and the non-selected data channels of the plurality of output channels are dummy output channels.

8. The liquid crystal display device according to claim 7, further comprising:

a shift register generating a sampling signal for shifting the pixel data and, at the same time, inputting the pixel data, wherein said channel selector applies an output signal from one of W, X, Y, and Z shift registers (where W, X, Y, and Z are integers) corresponding to the Ith, Jth, Kth, and Nth data channels, respectively, to a start pulse of a next stage data driver.

9. The liquid crystal display device according to claim 6, wherein said channel selector selects backward from the Nth output channel to any one of $I_1$, $J_1$, $K_1$, and $N_1$ (where $I_i$, $J_1$, $K_1$, and $N_1$ are integers) output channels as the data channels and a remaining number the non-selected data channels of the plurality of output channels are dummy output channels.

10. The liquid crystal display device according to claim 9, further comprising:

a shift register generating a sampling signal for shifting the pixel data and, at the same time, inputting the pixel data, wherein said channel selector applies a start pulse to one of the $I_1$, $J_1$, $K_1$, and $N_1$ shift registers of the N shift registers.

11. The liquid crystal display device according to claim 2, wherein the selection signal generator includes a switch for generating the channel selection signal.

12. The liquid crystal display device according to claim 2, wherein the selection signal generator includes a dip switch for generating the channel selection signal.

13. The liquid crystal display device according to claim 7, wherein the dummy output channels are floated.

14. A method of driving a liquid crystal display device comprising:

determining a desired resolution of a display;

selecting a data channel set from a plurality of output channels connected to data lines of a data driver corresponding to the desired resolution of the display, wherein the selecting a data output channel applies first to fourth channel control signals via a first and a second option pins to the data driver in response to a first and a second channel control selection signals;

supplying and outputting pixel data via the data channel set to the data lines, wherein pixel data is not supplied to and are not outputted by non-selected output channels;

enabling one of a plurality of scan lines; and supplying the pixel data from the data lines to liquid crystal cells connected to the enabled scan line.

15. The method according to claim 14, further comprising floating the non-selected output channels as dummy output channels.

16. The method according to claim 14, further comprising setting the non-selected output channels to a constant voltage.

17. The method according to claim 14, further comprising generating a channel selection signal for selecting the data channels.

18. The method according to claim 17, further comprising varying a number of selected data channels in accordance with the channel selection signal.

19. The method according to claim 18, wherein varying the number of selected data channels includes generating a first to a fourth logical values and, when said logical value is a fourth logical value, i data channels are selected, wherein i is a positive integer;

when said logical value is a third logical value, j data channels are selected, wherein j is a positive integer;

when said logical value is a second logical value, k data channels are selected, wherein k is a positive integer; and when said logical value is a first logical value, m data channels are selected, wherein m is a positive integer.

20. The method according to claim 18, wherein varying the number of selected data channels includes generating a first and a second logical values such that:

when said logical value is the second value, i data channels are selected, wherein i is a positive integer; and when said logical value is the first value, j data channels are selected, wherein j is a positive integer smaller than the total number of the plurality of output channels.

* * * * *